United States Patent Office 2,967,676
Patented Jan. 10, 1961

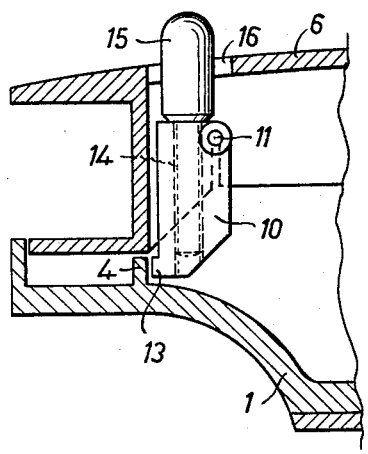
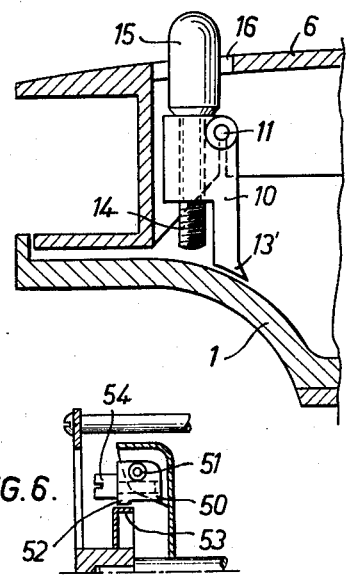
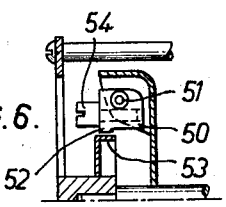
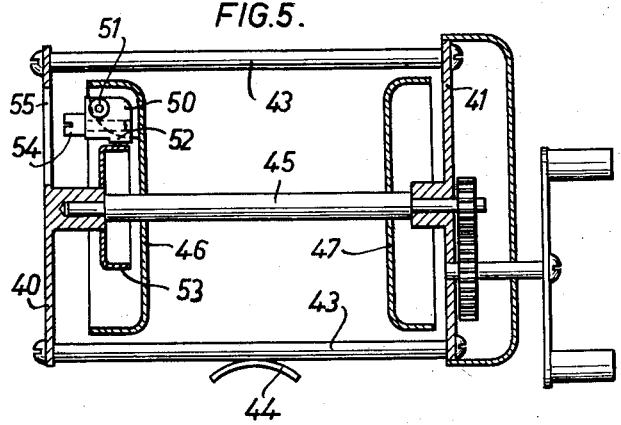

2,967,676

BRAKING DEVICE FOR FISHING REELS

Anders Ingemar Klingberg, Hermanstrop, Lindesberg, Sweden

Filed Nov. 27, 1956, Ser. No. 624,546

Claims priority, application Sweden Dec. 15, 1955

6 Claims. (Cl. 242—84.52)

This invention relates to fishing reels and more particularly to braking devices for such reels.

The object of the invention is to provide a braking device which permits adjusting the braking power in a simple way without requiring dismantling any member of the reel. Such an adjustment may be desired in order that the reel may be used for various kinds of baits without running the risk of having the line getting into disorder in casting which might result in case the spool unwinds the line too easily.

The braking device according to the invention comprises a braking member in the shape of a block mounted to swing easily on a pivot carried by the spool in such a relation to a stationary braking surface in the form of a surface of revolution, as to be caused to engage said surface under the action of the centrifugal force during the rotation of the spool, said block having means accessible from outside of the spool for adjusting the distribution of weight of the block with relation to said pivot with a view to varying the braking power.

By the aid of said adjusting means the braking block may be set into any position between a position of rest, in which the action of the centrifugal force is balanced so as not to yield any braking power, and a position of maximal braking power output.

The braking device according to the invention may be applied to fishing reels in which the spool is rotatably mounted at both ends in a drum having rod attaching means connected thereto, as well as to fishing reels, in which the spool is mounted in free hung relation to a disk-shaped base and freely open all around.

In the accompanying drawings both of said types are illustrated.

Figure 1:
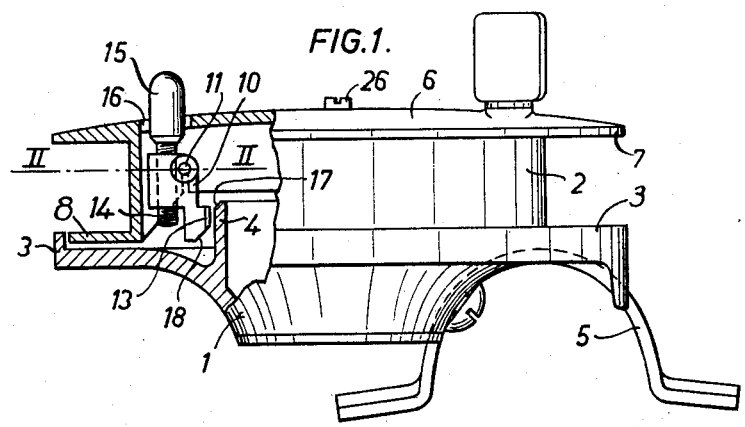
Figure 2:
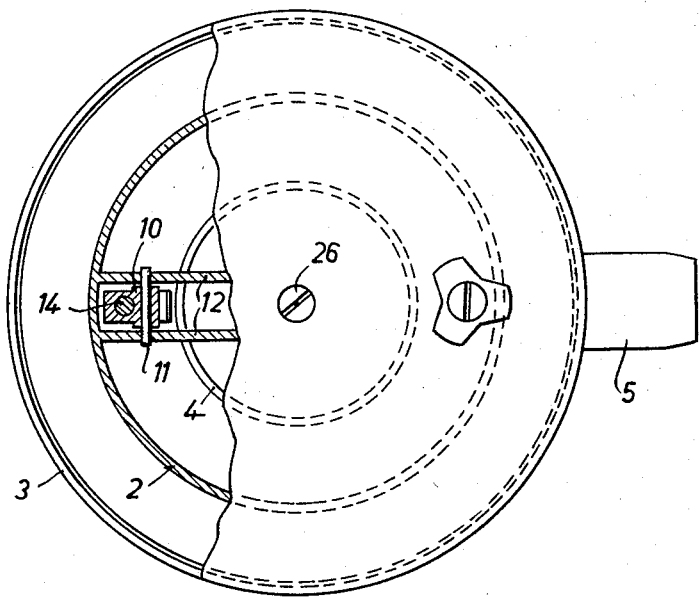

Fig. 1 is a side elevation, partly in section, of a fishing reel of the type including a spool mounted in free hung relation to a base member and provided with a braking device according to the invention. Fig. 2 is a top plan view of the reel shown in Fig. 1 with a portion of the top of the spool broken away in order to show the braking block in section along the line II—II of Fig. 1. Fig. 3 is an axial section of part of the spool and its base element with a modified form of braking device shown in side elevation. Fig. 4 is a similar view showing a still modified form of braking device. Fig. 5 is an axial section of a fishing reel of the type comprising a drum and a spool with a braking device according to the invention mounted in the spool. Fig. 6 is an axial section of part of a fishing reel of the same type as that shown in Fig. 5 provided with a modified form of braking device.

With reference to Figs. 1 and 2 of the drawing, the numeral 1 indicates the base member generally and 2 the spool generally. The base member comprises a substantially cup-shaped disk with a plan bottom and concave side walls ending in a cylindrical peripheral flange 3. The base member is provided with an inner flange 4 concentric with the peripheral flange 3 to act as a braking drum in cooperation with the centrifugal brake described below. The flange 4 also acts as a hub for mounting the base member on a shaft, not shown, while locking it against axial displacement thereon.

Inserted in a groove in the concave wall of the base member is a strap like rod attaching member 5 held in place by a screw.

The spool 2 is formed with a preferably outwardly curved top 6 but is open on its end towards the base member. The cylindrical wall of the spool to receive the line is bounded at opposite sides by flanges, viz. an upper one, 7 in Fig. 1, and a lower one 8.

The top 6 of the spool is formed with a central hub, not shown, for allowing mounting the spool on the shaft engaging the hub 4 of the base member. It is thus seen that in such case the spool is in free hung relation to the base member.

Provided inside the spool is a braking device for retarding the spool in the casting operation in order that the line may not unwind itself too hastily and get entangled. Said braking device comprises a block shaped braking shoe 10 having a pivot pin 11 extending therethrough. Said pivot pin projects beyond opposite sides of the block and is rotatably mounted in two parallel stays 12, Fig. 2, extending between the hub and the peripheral wall of the spool. As an alternative, the pivot pin 11 may be held against rotation to the stays 12, and the block be rotatably mounted on the pivot pin. At any rate, the block 10 is capable of swinging in an axial plane with relation to the axis of the spool.

The block 10 is formed with a shoe 13 for cooperation with the external peripheral surface of flange 4 of the base member and is further formed with a threaded boring for receiving a screw 14, the head of which constitutes a centrifugal weight 15. Said head 15 projects through a radially elongated slot 16 formed in the top 6 of the spool and is freely accessible from outside thereof to act as a handle for the screw.

The braking block with the screw 14 and its head 15 are so dimensioned and so positioned with relation to the pivot 11, that in a given position with relation to pivot 11, that is to say, when the screw is in its innermost position, no braking effect at all appears upon rotation of the spool. According as the screw is unscrewed the weight 15 will overrule and swing outwardly until the shoe 13 strikes flange 4. During the rotation of the spool in casting the pressure of the shoe 13 against flange 4 will increase under the action of the centrifugal force upon the weight 15. This action will grow more and more great according as the screw 14 is unscrewed, thereby increasing the length of the arm or lever of the weight 15 with reference to the centre of pivot 11. It is thus seen that by operating the screw 14, 15 any desired braking effect may be obtained without the need of dismantling any part of the apparatus.

If there would be necessary, for some other reason, to dismantle the apparatus, the spool should be loosened from the shaft inserted in the hub of the base member, as for instance, by unscrewing a locking screw 26 and lifting the spool off the base member. In order that the braking element 10 shall not be a hindrance to remounting the apparatus bevelings may be made both on the flange 4 and the braking element, as shown at 17 and 18, respectively, in Fig. 1.

The freely accessible centrifugal weight permits an individual adjustment of the braking power with relation to various kinds of baits, in order to secure the running without the risk of backlash.

In Figs. 3 and 4 a pair of modified forms of braking device for use in connection with fishing reels of the above described type are illustrated. Like references are used to indicate corresponding elements in all of the Figures 1–4.

In Fig. 3 the braking shoe proper 13 is adapted to engage the inner cylindrical surface of flange 4 of the base member 1. In this case the braking power may be decreased by unscrewing the screw 14 by means of its head 15.

In Fig. 4 the braking shoe proper 13' is adapted to cooperate with the inner surface of the conical wall of base member 1.

All of the embodiments above described are designed for use in combination with fishing reels the spools of which is mounted in free hung relation to a base member which is open all around. It is to be noted, however, that a braking device based on the same principle as that above described may be used also in connection with fishing reels of "conventional" type, that is to say, reels in which the spool is mounted at both ends in a drum provided with rod attaching means, and in which said drum, as a rule, comprises a pair of disk-shaped end walls connected together at their peripheral portions by means of axial stays.

In Fig. 5 such an embodiment is shown in an axial section. It is to be noted that only such elements as are needed to illustrate the invention are shown.

With reference to Fig. 5 the numerals 40 and 41 designate the disks forming the end walls of the drum and 43 is the axial stays therebetween. One of said stays is provided with a seat 44 for receiving rod attaching means. The discs 40 and 41 are provided with hubs for receiving a central spool member 45. Said spool members carries two disks 46, 47 one adjacent each end of the spool. The disks 46, 47 are formed at their peripheries with cylindrical flanges facing the respective end walls of the drum. Located in one of this cup-shaped discs, as 46, is a braking device according to the invention. Said device comprises a block 50 mounted on a pivot 51 extending at right angles to an axial plane through the block. The block is formed with a shoe 52 for cooperation with the external cylindrical surface of a braking drum 53, rigidly connected to or formed integrally with the hub of the adjacent end wall 40 of the drum. Engaging in a threaded boring in the block 50 in a direction parallel with the axis of spool 45 is a screw 54 representing the adjusting means of the block. The head of said screw serving as a regulating weight faces the end wall 40 of the drum and is accessible by means of a screw driver through an opening 55 in said end walls 40. With said screw fully screwed in, no or only a low braking effect is obtained. According as the screw is unscrewed the action of the centrifugal force may cause the end of the block supporting the screw head to swing outwardly, thereby moving the other end of the block inwardly so as to force the shoe 52 with more and more increasing power against the braking drum.

Fig. 6 illustrates a modified form of the braking device shown in Fig. 5. The modification resides in placing the shoe 52 by the end of the block supporting the screw head, the weights of the block portions at axially opposite sides of the pivot 51 being so related to each other that the shoe will be forced against the braking drum 53 by a power which is greatest in the innermost position of the screw and decreases according as the screw is unscrewed.

It is to be noted that the embodiment above described and illustrated by the drawings are only to be considered as examples, in that other modifications may be made without departing from the principle or scope of the invention as defined by the appended claims.

I claim:

1. In a fishing reel in combination, a rigid base member, a spool rotatably mounted in said base member, said base member being formed with a braking surface in the shape of a surface of revolution with relation to the axis of rotation of the spool, a braking block pivotally mounted in said spool allowing said block to swing in a plane axilaly related to the spool under the action of centrifugal force as exerted by the rotation of the spool, said braking block and its pivot being so located with respect to the braking surface of the base member as to allow said block to come into contact with said braking surface under the action of a predetermined degree of centrifugal force, and means accessible from outside the spool for preadjusting the braking action by changing the position of balance of the braking block with relation to its pivot.

2. A fishing reel as claimed in claim 1, and in which said braking block is provided with a threaded boring, said adjusting means comprising a screw having a head freely accessible from outside of the reel, said screw being in engagement with said threaded boring in the braking block, said boring being so positioned that the combination of braking block and screw form a two-armed lever, one end of which is adapted to engage the braking surface and the other end of which is represented in part by the screw head, the relation between the lengths of arms of said lever being adjustable by screwing the screw inwards or outwards.

3. A fishing reel as claimed in claim 2, and in which the pivotal mounting of said braking block is provided by a pivot pin mounted inside of and carried by said spool, said pin extending in a direction at right angles to a plane axially related to said spool, said braking block having two ends, said spool having an end, and said regulating screw extending from one of said ends of the block in a direction substantially axial with respect to said spool with the head of said screw projecting to a position external of said end of the spool.

4. A fishing reel is claimed in claim 3, and in which said braking surface is comprised of a cylindrical external peripheral surface of a flange of said base member, the other of said ends of the block, remote from the regulating screw, being formed with a braking shoe for cooperation with said external cylindrical peripheral surface of said flange of said base member.

5. A fishing reel as claimed in claim 3, and in which said cylindrical braking surface is an inwardly facing surface of a flange formed on said base member and in which said braking block has a shoe positioned for cooperation with said inwardly facing surface of said flange of the base member.

6. A fishing reel as claimed in claim 2, and in which said spool is rotatably mounted in said base member at both of the spool ends, said spool having two end walls, said braking block being mounted on one of said end walls of the spool for cooperation with said braking surface of said base member, and in which the regulating screw of the block is parallel with the axis of the spool.

References Cited in the file of this patent

UNITED STATES PATENTS

| | | |
|---|---|---|
| 1,347,529 | Wherry | July 27, 1920 |
| 1,566,594 | Graham | Dec. 22, 1925 |
| 1,971,470 | Watson | Aug. 28, 1934 |
| 2,055,358 | Maynes | Sept. 22, 1936 |

FOREIGN PATENTS

| | | |
|---|---|---|
| 216,390 | Great Britain | May 29, 1924 |
| 397,652 | France | Mar. 3, 1909 |
| 569,108 | Germany | Jan. 28, 1933 |